Oct. 9, 1928.  
J. A. SAXON  
1,686,767  
ROTARY INTERNAL COMBUSTION ENGINE  
Filed March 31, 1927 6 Sheets-Sheet 1
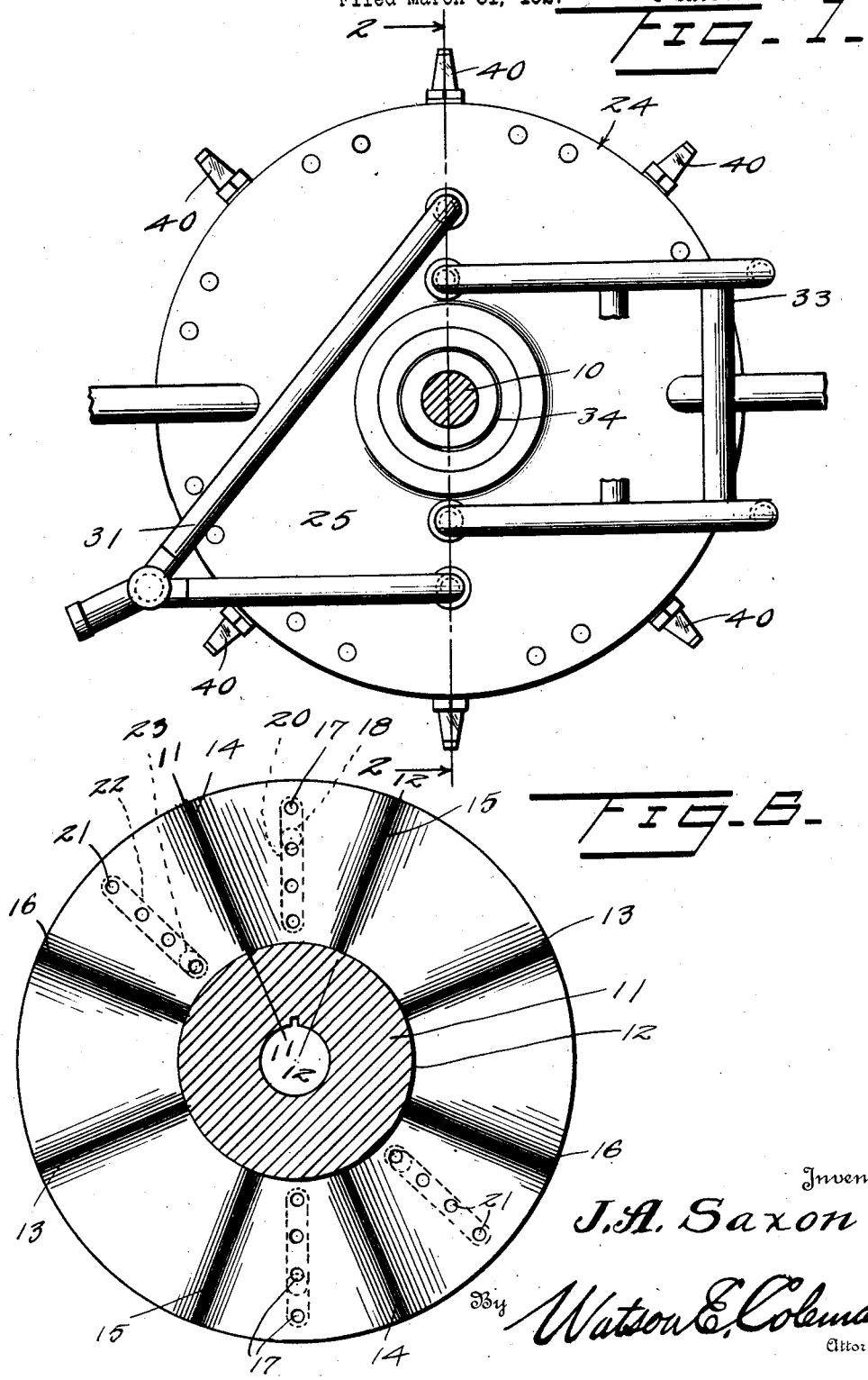
Inventor  
J. A. Saxon  
By Watson E. Coleman  
Attorney

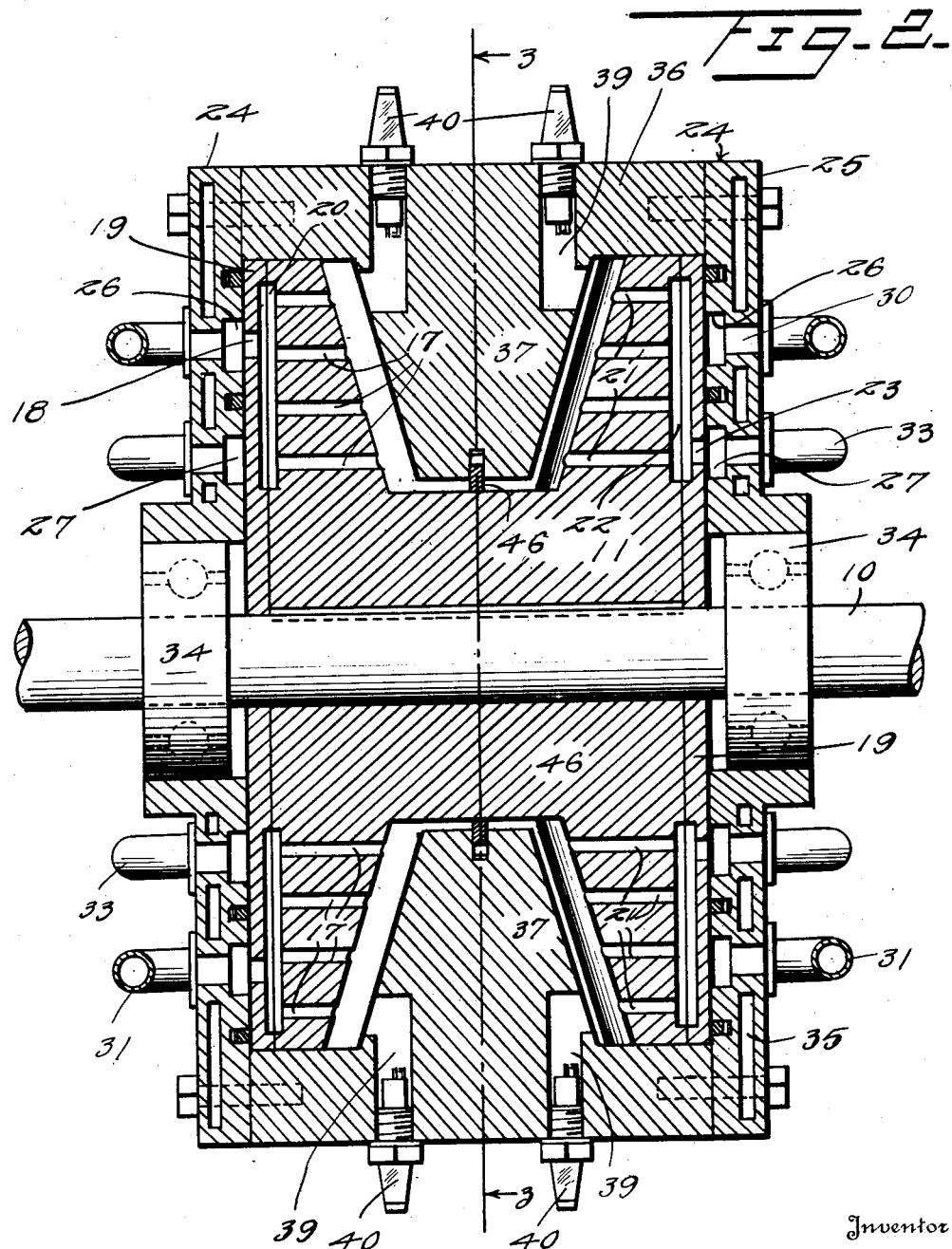

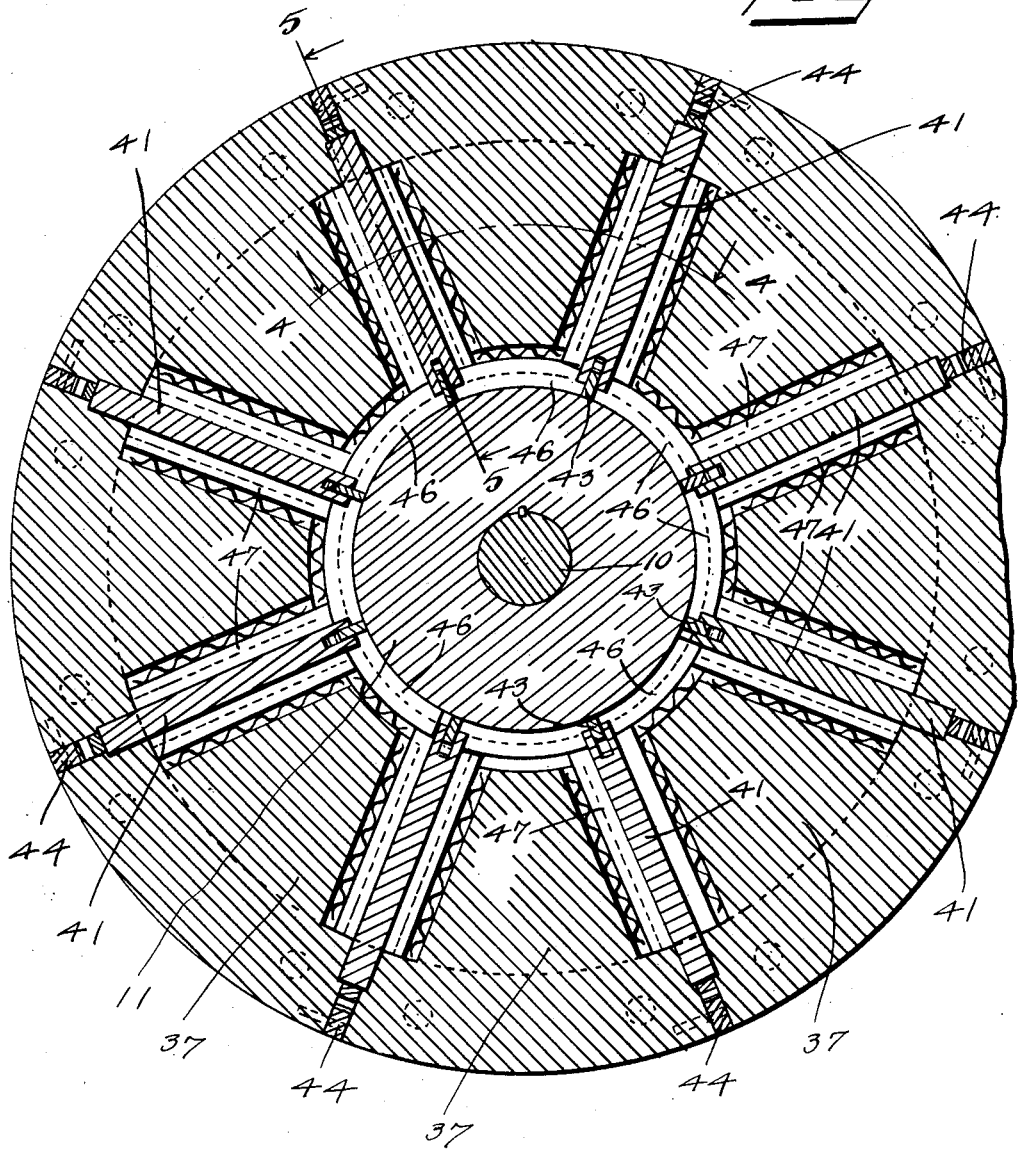

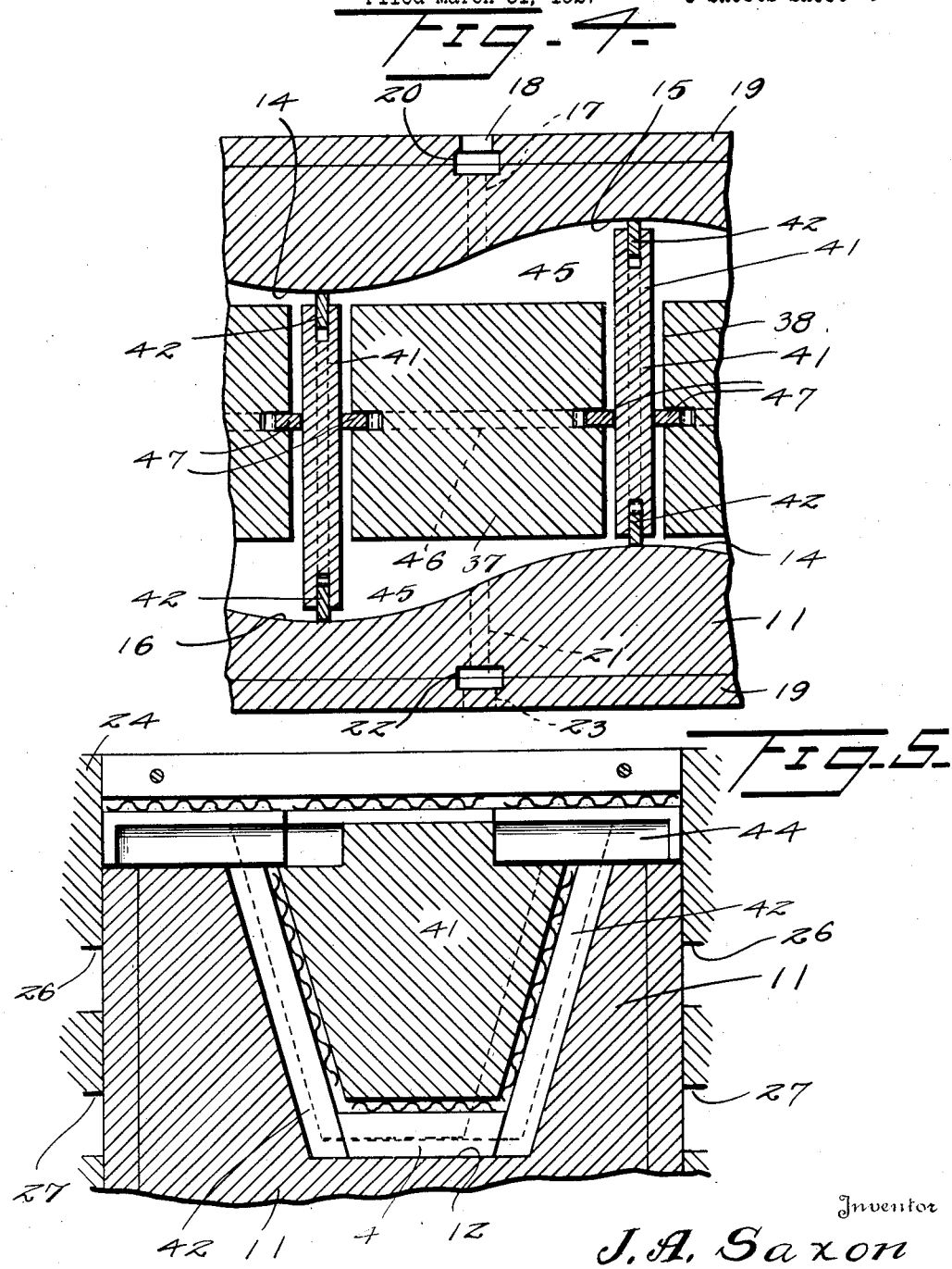

Oct. 9, 1928.

J. A. SAXON 1,686,767

ROTARY INTERNAL COMBUSTION ENGINE

Filed March 31, 1927        6 Sheets-Sheet 5

Inventor
J. A. Saxon
By Watson E. Coleman
Attorney

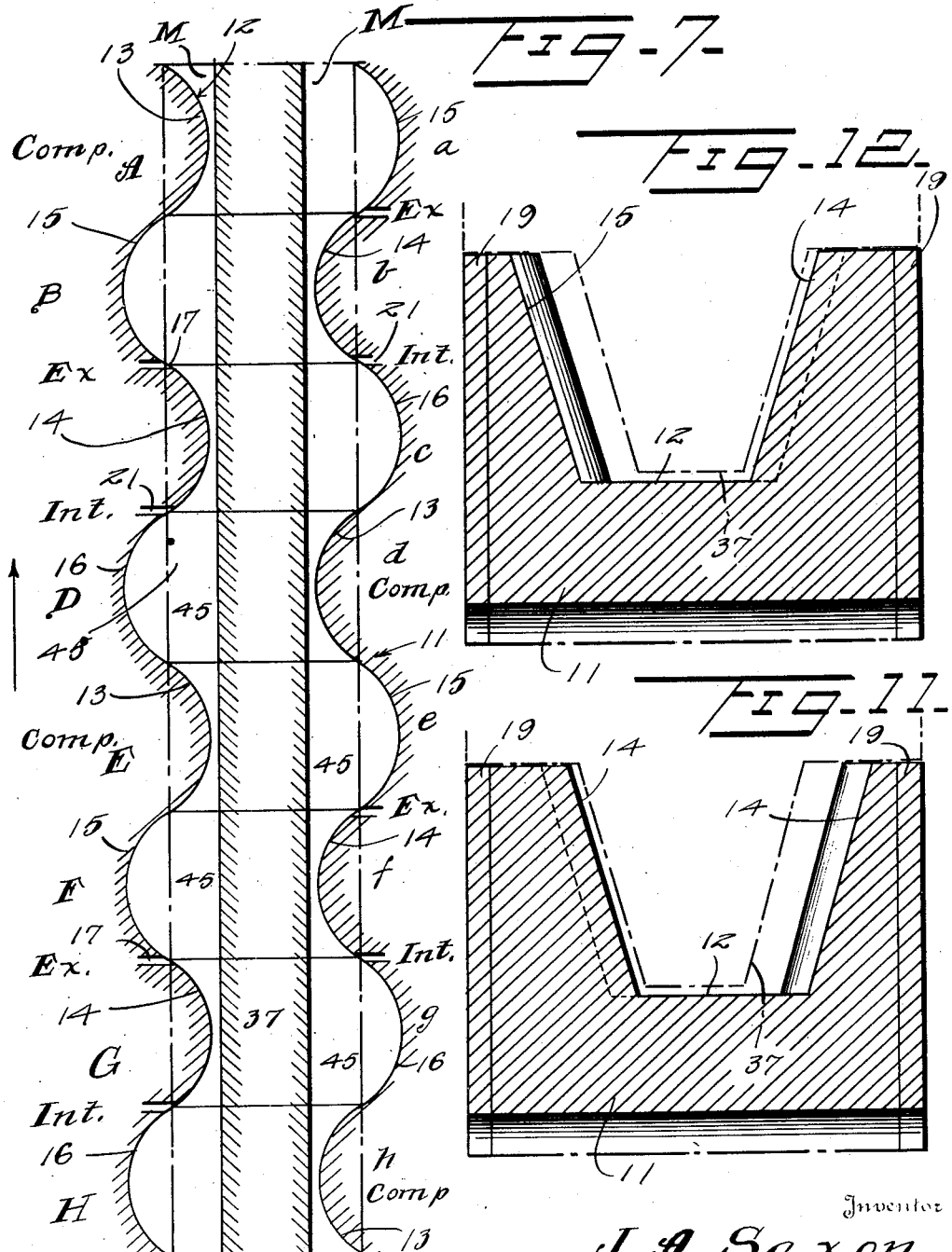

Patented Oct. 9, 1928.

1,686,767

UNITED STATES PATENT OFFICE.

JAMES ANGLO SAXON, OF SAPULPA, OKLAHOMA.

ROTARY INTERNAL-COMBUSTION ENGINE.

Application filed March 31, 1927. Serial No. 179,905.

This invention relates to rotary internal combustion engines and more particularly to a device of this character embodying a plurality of combustion chambers having a common piston formed by the walls of a rotor.

An important object of the invention is to provide a construction of this character in which a substantially constant power impulse is given to the rotor.

A further object of the invention is to provide a construction of this character in which the frictional resistance of moving parts is reduced to a minimum.

A still further object of the invention is to provide a device of this character which may be readily constructed and which will be durable and efficient in service.

A further and more specific object of the invention is the provision of an engine including a rotor having a sinuous groove formed therein, between the walls of which operate baffle plates or partitions, subdividing the groove into a plurality of spaces forming combustion chambers which, by their coaction with the stator, which extends into the groove, actually form a plurality of cylinders, of which the sinuous walls of the rotor form the piston.

These and other objects I attain by the construction shown in the accompanying drawings, wherein for the purpose of illustration is shown a preferred embodiment of my invention and wherein:—

Figure 1 is a side elevation of an internal combustion engine constructed in accordance with my invention;

Figure 2 is a section on the line 2—2 of Figure 1;

Figure 3 is a section on the line 3—3 of Figure 2;

Figure 4 is a section on the line 4—4 of Figure 3;

Figure 5 is a section on the line 5—5 of Figure 3;

Figure 6 is a vertical sectional view through the rotor;

Figure 7 is a diagrammatic view illustrating the operation of the engine;

Figure 11 is a sectional view through the rotor on the line 11—11 of Figure 6, the stator being indicated in dotted lines;

Figure 12 is a similar view taken on the line 12—12 of Figure 6.

Figure 8:
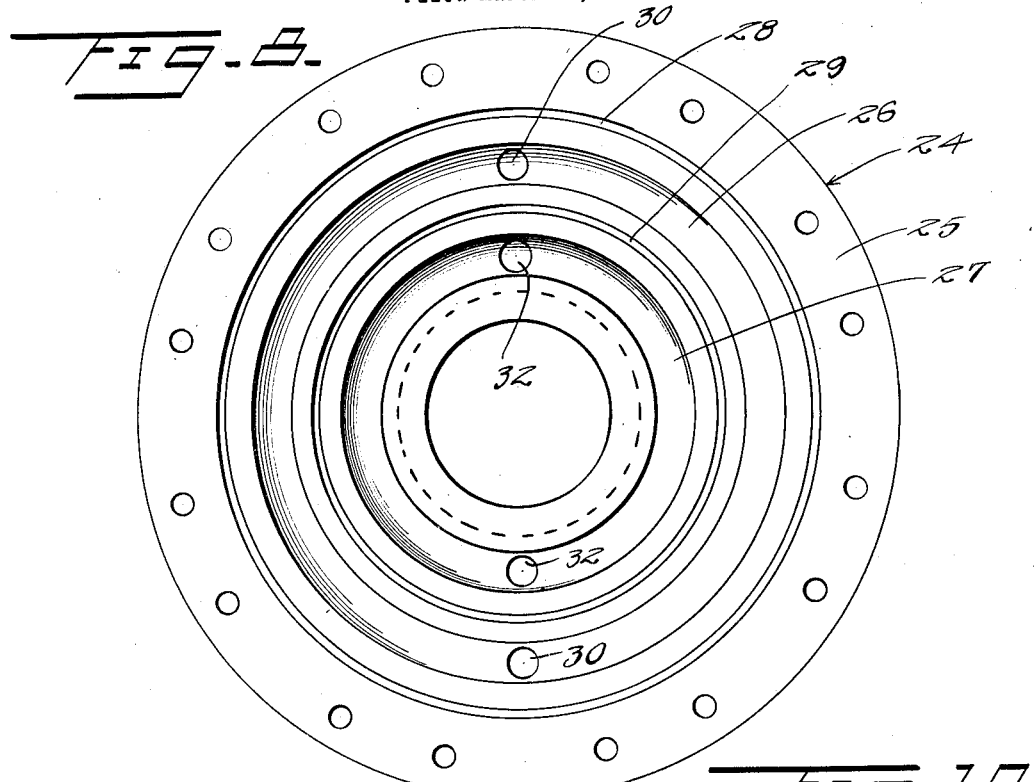
Figure 8 is an inner side elevation of one of the side plates of the stator.
Figures 9, 10:
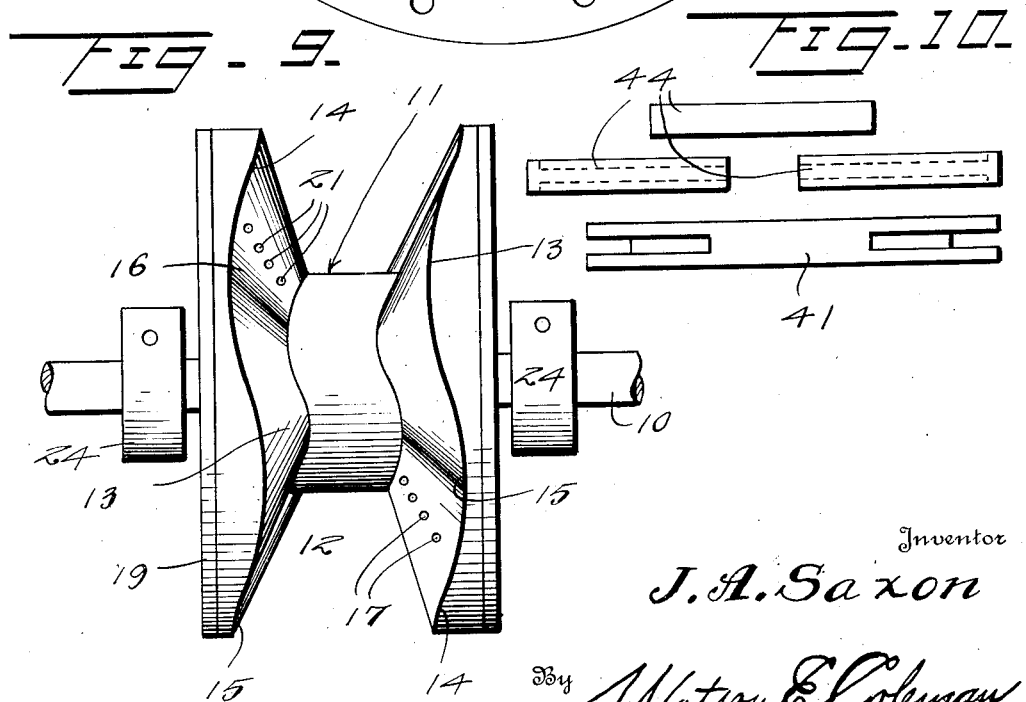
Figure 9 is an edge elevation of the rotor.
Figure 10 is a composite view of one of the plates and the packings employed to seal this plate to the stator and rotor at the upper end thereof.

Referring now more particularly to the drawings, the numeral 10 designates a shaft and 11 generally designates a disk secured to the shaft to rotate therewith. The periphery of this disk, which forms the rotor of the engine, is provided with a circumferential sinuous channel, the walls of which are parallel and preferably converge downwardly. The sinuosity of the walls is regular and of alternate cambers of each wall, the foremost, as regards the direction of rotation, forms a compression and power piston 13, while the next succeeding forms a scavenging piston, indicated at 14. The foremost concavity 15 provides the expansion space for exploded gases, while the next succeeding concavity 16 provides the necessary increase in size of the cylinders, formed as hereinafter described, which causes a reduction of pressure in these cylinders to provide for intaking of the explosive charge. At the medial line, generally designated at M in the diagram, between the camber 14 and concavity 15, a radial row of ports 17 is formed, which ports communicate with a single outlet 18 formed in the corresponding face of the disk. The outer face of the disk is shown as having a plate 19 secured thereto and sealed thereto by a gasket. One or both of confronting faces of the disk 11 and plate 19 are grooved to provide a channel 20, with which all of the ports 17 communicate and which also communicates with the outlet port 18. These ports form exhaust ports, as will hereinafter more clearly appear.

Upon the medial line M between the cambers 14 and the concavity 16, a second radial row of ports 21 is formed similar to the ports 17 and communicating through a channel 22 with an inlet port 23. In the construction at present illustrated, the groove 12 provides two series of the cambers 13 and 14 and concavities 15 and 16 upon each side wall and the camber 13 of one side wall aligns with the concavity 16 of the other side wall, so that the elements of one wall are staggered with relation to the similar elements of the other wall and the cambers 13 are uniformly circumferentially spaced about the structure.

It will be obvious that under these circumstances, there are two ports 18 at each end face of the rotor and likewise two ports 23.

The ports 18 of each side are arranged upon a common circumference as are the ports 23. In the present construction, the ports 23 are shown as arranged upon an internal circumference and the ports 18 upon an external circumference. A stator, generally designated at 24, includes side plates 25 confronting the end faces of the disk. These plates 25 have formed therein annular grooves 26 and 27 having the same diameters as the circumferences upon which the ports 18 and 23 are arranged. Of the confronting faces of the end face of the disk, in this construction the outer faces of the plates 19, and of the plates 26, one is provided with spring-pressed sealing rings 28 and 29, providing seals outwardly of the groove 26 and between the grooves 26 and 27 respectively. The grooves 26 communicate through ports 30 in the wall of the plate 25 with an exhaust manifold 31, while the grooves 27 similarly communicate through ports 32 with an intake manifold 33. The ports 26 and 27 are preferably arranged in pairs diametrically opposed and the manifolds branched for communication with these pairs of ports. The shaft 10 is provided with roller bearings 34 engaging in axial openings formed in the side plates 25 of the stator. The plates 25 have water spaces 35 formed therein.

The stator 24 includes a peripheral wall 36 having extending inwardly therefrom an annular rib 37. The annular rib 37 is slotted by radial slots 38 extending transversely therethrough, these slots being spaced apart a distance equal to the distance between adjacent edges of the cambers of concavities of the wall at the medial line M. The rib 37 is of substantially the same depth as the groove 12 and the side faces thereof converge downwardly at the same angle of convergence as the walls of the groove. Ports 39 extend through the peripheral wall and open at their inner ends through the side faces of each segment of the rib and at their outer ends are threaded for the reception of spark plugs 40. In the present construction, eight of the slots 38 are provided in the structure, thus producing eight segments. Each segment and the corresponding portion of the peripheral wall is preferably formed as a unit and the separate units are secured to the peripheral edges of the plates 25, as indicated. Slidable in each slot are partition plates 41 conforming in shape to the shape of the groove and of substantially the same width and depth as the groove. The side edges and bottom of the plates have sealing engagement with the side walls and bottom of the groove 12 by spring-pressed packings 42 and 43 and the upper wall at its outer edges has sealing engagement with the peripheral wall 36, at 44, so that as the plate extends to one side or the other of the rib 37, a complete seal is provided.

It will be obvious that these plates shifted transversely of the rib 36, by their engagement with the walls of the groove 12, combine with the walls of the groove and the outer peripheral wall to produce at opposite sides of the rib 36 chambers 45. In order to complete the seal between the chambers formed by the plates at opposite sides of the rib, the inner wall of each rib segment is provided with a spring-pressed circumferentially extending packing element 46, which engages against the bottom of the groove. The side walls of the slots 38 are likewise provided with spring-pressed packings 47 engaging the side faces of the plates.

In operation, the spark plugs will, of course, be connected with a suitable distributer and as the rotor rotates, each successive chamber 45, during each rotation, passes through the following series of operations: Assuming a charge is compressed therein and the rotor is moving in the direction of the arrow of the diagrammatic view of Figure 7, the explosions take place simultaneously in the chambers A, E d and h. With the explosion, the expansion of the gases demands an increase in size of the chamber, with the result that the rotor is given an impulse in the direction of the arrow, bringing the concavity 15 between the plates forming the end walls of these chambers. As the concavity fully aligns with these chambers, the exhaust ports 17 communicate with the chambers and the exhaust gases begin their passage therethrough. These exhaust ports remain in communication with the chambers until the cambers 14 are substantially fully aligned with the chamber, at which time the exhaust ports pass out of alignment with the chambers and intake ports 21 align therewith. During the aligment of the cambers 14 with these chambers, the chambers are constantly reducing in size, so that the expulsion of exhaust gases is expedited. From the time of alignment of the intake ports 21 with the chambers, the size of the chambers is increasing, with the result that a fresh charge is drawn into the chamber. When the chamber has attained its largest size, the intake ports pass out of alignment therewith and the chamber immediately begins to reduce as the camber 13 aligns therewith. It will thus be seen that each successive chamber passes through a four cycle operation and since, with the construction illustrated, each chamber will, during each rotation, be twice subjected to these cycles and there are eight chambers at each side of the stator, there will be thirty-two explosions for each rotation of the rotor. Thus, a substantially continuous power impulse is applied to the rotor, rendering the same smooth in operation and substantially uniform as to power output.

Since it will be obvious that the construction hereinbefore set forth is capable of a certain range of change and modification without materially departing from the spirit of the invention, I do not limit myself to such specific structure except as hereinafter claimed.

I claim:—

1. In a rotary internal combustion engine, a rotor having a sinuous groove in its periphery, a stator having a rib extending into said groove and of less width than the mean width of said groove, said rib having transversely extending slots formed therein, plates slidable in the slots of said rib and fitting between the walls of the sinuous groove, adjacent plates combining with the walls of the rotor groove and the stator to produce at opposite sides of the rib of the stator a pair of chambers of which the plates at all times form the end walls and means for introducing an explosive charge to said chambers and for exhausting the products of combustion therefrom.

2. In a rotary internal combustion engine, a rotor having a sinuous groove in its periphery, a stator having a rib extending into said groove and of less width than the mean width of said groove, said rib having transversely extending slots formed therein, plates slidable in the slots of said rib and fitting between the walls of the sinuous groove, adjacent plates combining with the walls of the rotor groove and the stator to produce at opposite sides of the rib of the stator a pair of chambers of which the plates at all times form the end walls and means for introducing an explosive charge to said chambers and for exhausting the products of combustion therefrom comprising openings in the walls of said rotor spaced apart a distance equal to the distance between adjacent plates and having disposed therebetween a camber of the wall of the rotor groove.

3. In a rotary internal combustion engine, a rotor having a sinuous groove in its periphery, a stator having a rib extending into said groove, said rib having transversely extending slots formed therein, plates slidable in the slots of said rib and fitting between the walls of the sinuous groove, adjacent plates combining with the walls of the rotor groove and the stator to produce at opposite sides of the rib of the stator a pair of chambers and means for introducing an explosive charge to said chambers and for exhausting the products of combustion therefrom comprising openings in the walls of said rotor spaced apart a distance equal to the distance between adjacent plates and having disposed therebetween a camber of the wall of the rotor groove, the opening in advance as regards the direction of rotation being an exhaust opening, the other opening being in communication with a source of explosive mixture.

4. In a rotary internal combustion engine, a rotor having a sinuous groove in its periphery, a stator having a rib extending into said groove and of less width than the mean width of said groove, said rib having transversely extending slots formed therein, plates slidable in the slots of said rib and fitting between the walls of the sinuous groove, adjacent plates combining with the walls of the rotor groove and the stator to produce at opposite sides of the rib of the stator a pair of chambers of which the plates at all times form the end walls and means for introducing an explosive charge to said chambers and for exhausting the products of combustion therefrom comprising openings in the walls of said rotor spaced apart a distance equal to the distance between adjacent plates and having disposed therebetween a camber of the wall of the rotor groove, the opening in advance as regards the direction of rotation being an exhaust opening, the other opening being in communication with a source of explosive mixture, the last named opening of each pair being spaced from the first named opening of the next succeeding pair a distance equal to the distance between a given plate and the third plate removed therefrom, the wall of the rotor groove in said space having a pair of concavities and a camber, the camber being located at the center of the space.

5. In a rotary internal combustion engine, a rotor having a sinuous groove in its periphery, a stator sealing to the sides of the rotor and having a peripheral wall provided with an inwardly directed rib extending into the groove of the rotor, said rib at its inner end having sealing engagement with the bottom of the groove, said rib being transversely slotted at circumferentially spaced points, plates slidable in said slots having sealing engagement with the bottom and side walls of the rotor groove at their bottom and side edges and having sealing engagement with said rib and peripheral wall, said rib being of less width than the mean width of the groove of the rotor whereby chambers are formed at opposite sides of the rib by each pair of adjacent plates of which the plates at all times form the end walls and means for introducing an explosive charge to and exhausting the products of combustion from each chamber, the side walls of said rotor groove being regularly sinuous and parallel to one another whereby said chambers alternately increase and decrease in size.

6. A device as claimed in claim 5, wherein the means for injecting and exhausting comprise openings formed through the walls of the rotor spaced apart a distance equal to the distance between adjacent plates and having disposed therebetween a camber of the wall of the rotor groove.

7. A device as claimed in claim 5, wherein the means for injecting and exhausting comprise radially extending rows of spaced openings formed in the wall of the rotor groove and outlet openings formed in the outer wall of the rotor in alignment with and communicating with all of the openings of the associated groups, said openings being differently radially spaced from the axis of the rotor and communicating with annular grooves produced in the end walls of the stator.

8. In a rotary internal combustion engine, a rotor having a sinuous groove in its periphery, a stator having a rib extending into said groove, said rib having transversely extending slots formed therein, plates slidable in the slots of said rib and fitting between the walls of the sinuous groove, adjacent plates combining with the walls of the rotor groove and the stator to produce at opposite sides of the rib of the stator a pair of chambers and means for introducing an explosive charge to said chambers and for exhausting the products of combustion therefrom comprising openings in the walls of said rotor spaced apart a distance equal to the distance between adjacent plates and having disposed therebetween a camber of the wall of the rotor groove, said openings being arranged in radially spaced rows and the end faces of the rotor having plates applied thereto, one of confronting faces of the plates and rotor being provided with a radially extending groove with which the associated openings communicate, the plate having a single outlet opening therein, the outlet openings of the groups being differently spaced from the axis of the rotor.

9. A device as claimed in claim 8 wherein the stator has end plates abutting the outer faces of the plates applied to the rotor, the inner faces of the stator plates having annular grooves aligning with the openings of the rotor plates, the walls of the stator plates having openings communicating with the grooves thereof and adapted for communication with manifolds.

10. A device as claimed in claim 8 wherein the stator has end plates abutting the outer faces of the plates applied to the rotor, the inner faces of the stator plates having annular grooves aligning with the openings of the rotor plates, the walls of the stator plates having openings communicating with the grooves thereof and adapted for communication with manifolds and means sealing the stator plates to the rotor plates intermediate the grooves and outwardly of the outermost groove.

In testimony whereof I hereunto affix my signature.

JAMES ANGLO SAXON.